United States Patent [19]
Zenda

[11] Patent Number: 5,438,652
[45] Date of Patent: * Aug. 1, 1995

[54] DISPLAY CONTROL APPARATUS FOR CONVERTING COLOR/MONOCHROMATIC CRT GRADATION INTO FLAT PANEL GRADATION

[75] Inventor: Hiroki Zenda, Hamura, Japan

[73] Assignee: Kabushiki Kaisha Toshiba, Kawasaki, Japan

[ * ] Notice: The portion of the term of this patent subsequent to Mar. 8, 2011 has been disclaimed.

[21] Appl. No.: 14,470

[22] Filed: Feb. 5, 1993

Related U.S. Application Data

[63] Continuation of Ser. No. 7,023, Jan. 21, 1993, Pat. No. 5,293,485, which is a continuation of Ser. No. 406,066, Sep. 12, 1989, abandoned.

[30] Foreign Application Priority Data

Sep. 13, 1988 [JP] Japan .................... 63-229016
Sep. 13, 1988 [JP] Japan .................... 63-229020

[51] Int. Cl.⁶ ................ G06F 15/00; G09G 3/00
[52] U.S. Cl. ................................. 395/131
[58] Field of Search ............ 395/164, 162, 165, 166, 395/131; 345/82, 84, 87; 358/239, 140; 382/44, 47

[56] References Cited

U.S. PATENT DOCUMENTS

| | | | |
|---|---|---|---|
| 3,928,845 | 12/1975 | Clark | 340/324 |
| 4,121,283 | 10/1978 | Walker | 364/200 |
| 4,344,021 | 8/1982 | Johnston | 315/383 |
| 4,399,524 | 8/1983 | Muguruma et al. | 365/229 |
| 4,422,163 | 12/1983 | Oldenkamp | 365/229 |
| 4,430,649 | 2/1984 | Leininger | 340/731 |
| 4,454,593 | 6/1984 | Fleming et al. | 364/900 |
| 4,536,856 | 8/1985 | Hiroishi | 364/900 |

(List continued on next page.)

FOREIGN PATENT DOCUMENTS 0195203 9/1986 European Pat. Off. .
0281502A1 9/1988 European Pat. Off. .
61-221921 3/1985 Japan .

OTHER PUBLICATIONS

Operation Manual—EGAWONDER, Jan. 1987, Tech. Inc.
Advertisement—EGAWONDER, PC Magazine, Feb. 1987.
IBM Enhanced Graphics Adapter—IBM Enhanced Graphics—(Aug. 2, 1984).
PEGA 2 User's Guide, 50208, Rev. 4, 1986, Paradise Systems, Inc., pp. 10-16 and 50.

*Primary Examiner*—Phu K. Nguyen
*Attorney, Agent, or Firm*—Finnegan, Henderson, Farabow, Garrett & Dunner

[57] ABSTRACT

A display control apparatus in a system which is equipped with a plasma display unit as a standard I/O device and which can arbitrarily be connected to a monochromatic or color CRT display unit, includes a CRT palette in which gradation or color data is set from a CRT-BIOS, a PDP palette in which PDP gradation data is set, an arithmetic circuit for performing a predetermined arithmetic operation of the color data from the CRT palette and outputting gradation parameters, and a conversion table for storing a correspondence between the PDP gradation data and the CRT gradation data or the gradation parameters. The CRT gradation data set in the CRT palette is converted into PDP gradation data by the conversion table for storing the correspondence between the CRT gradation and the PDP gradation. The color data set in the CRT palette is subjected to a predetermined arithmetic operation by the arithmetic unit, thereby generating the gradation parameters. The parameters are converted into the gradation data by the conversion table for storing the correspondence between the CRT gradation parameters and the PDP gradation data. The converted data is set in the PDP palette.

42 Claims, 11 Drawing Sheets

U.S. PATENT DOCUMENTS

| | | | |
|---|---|---|---|
| 4,566,005 | 1/1986 | Apperley et al. | 340/771 |
| 4,574,279 | 3/1986 | Roberts | 340/731 |
| 4,611,203 | 9/1986 | Criscimagna et al. | 340/773 |
| 4,628,534 | 12/1986 | Marshall | 382/41 |
| 4,679,038 | 7/1987 | Bantz et al. | 340/721 |
| 4,730,186 | 3/1988 | Koga et al. | 340/708 |
| 4,751,502 | 6/1988 | Ishii et al. | 340/709 |
| 4,760,387 | 7/1988 | Ishii et al. | 340/716 |
| 4,763,279 | 8/1988 | Kellam et al. | 364/518 |
| 4,764,975 | 8/1988 | Inoue | 382/47 |
| 4,769,852 | 9/1988 | Hashimoto et al. | 382/45 |
| 4,847,788 | 7/1989 | Shimada | 364/522 |
| 4,860,246 | 8/1989 | Inoue | 364/900 |
| 4,901,140 | 2/1990 | Lang et al. | 358/64 |
| 4,926,166 | 7/1990 | Fujisawa et al. | 340/717 |
| 4,980,678 | 12/1990 | Zenda | 340/716 |
| 4,990,902 | 2/1991 | Zenda | 340/731 |
| 4,990,904 | 2/1991 | Zenda | 340/771 |
| 4,998,099 | 3/1991 | Ishii | 340/784 |
| 5,111,190 | 2/1991 | Zenda | 340/717 |
| 5,222,206 | 6/1993 | Liao | 395/131 |

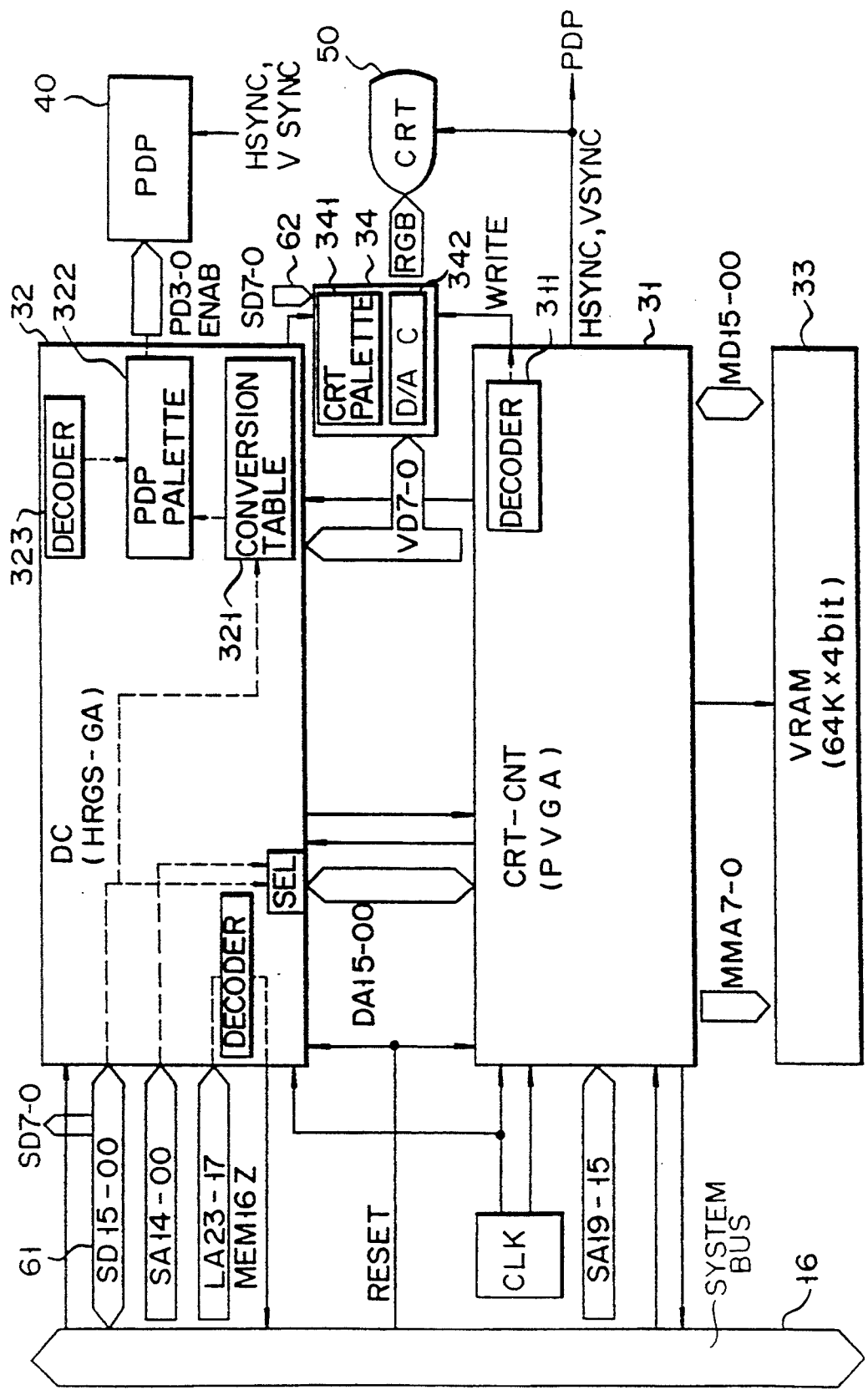
F I G. 2

| ADDRESS | DATA | ADDRESS | DATA | ADDRESS | DATA | ADDRESS | DATA |
|---|---|---|---|---|---|---|---|
| 00 | 0 | 10 | 5 | 20 | 9 | 30 | D |
| 01 | 1 | 11 | 5 | 21 | A | 31 | D |
| 02 | 1 | 12 | 6 | 22 | A | 32 | D |
| 03 | 1 | 13 | 6 | 23 | A | 33 | E |
| 04 | 1 | 14 | 6 | 24 | A | 34 | E |
| 05 | 1 | 15 | 7 | 25 | B | 35 | E |
| 06 | 2 | 16 | 7 | 26 | B | 36 | E |
| 07 | 2 | 17 | 7 | 27 | B | 37 | E |
| 08 | 2 | 18 | 7 | 28 | B | 38 | E |
| 09 | 3 | 19 | 8 | 29 | C | 39 | F |
| 0A | 3 | 1A | 8 | 2A | C | 3A | F |
| 0B | 3 | 1B | 8 | 2B | C | 3B | F |
| 0C | 4 | 1C | 8 | 2C | C | 3C | F |
| 0D | 4 | 1D | 9 | 2D | C | 3D | F |
| 0E | 4 | 1E | 9 | 2E | D | 3E | F |
| 0F | 5 | 1F | 9 | 2F | D | 3F | F |

F I G. 3

| ADDRESS | DATA | ADDRESS | DATA | ADDRESS | DATA | ADDRESS | DATA |
|---|---|---|---|---|---|---|---|
| 00 | 0 | 10 | 5 | 20 | 9 | 30 | D |
| 01 | 1 | 11 | 5 | 21 | A | 31 | D |
| 02 | 1 | 12 | 6 | 22 | A | 32 | D |
| 03 | 1 | 13 | 6 | 23 | A | 33 | E |
| 04 | 1 | 14 | 6 | 24 | A | 34 | E |
| 05 | 1 | 15 | 7 | 25 | F | 35 | E |
| 06 | 2 | 16 | 7 | 26 | F | 36 | E |
| 07 | 2 | 17 | 7 | 27 | F | 37 | E |
| 08 | 2 | 18 | 7 | 28 | F | 38 | E |
| 09 | 3 | 19 | 8 | 29 | C | 39 | B |
| 0A | 3 | 1A | 8 | 2A | C | 3A | B |
| 0B | 3 | 1B | 8 | 2B | C | 3B | B |
| 0C | 4 | 1C | 8 | 2C | C | 3C | B |
| 0D | 4 | 1D | 9 | 2D | C | 3D | B |
| 0E | 4 | 1E | 9 | 2E | D | 3E | B |
| 0F | 5 | 1F | 9 | 2F | D | 3F | B |

F I G. 4

| RED | GREEN | BLUE |
|-----|-------|------|
| $0_H$ | $0_H$ | $0_H$ |
| $0_H$ | $0_H$ | $2A_H$ |
| $0_H$ | $2A_H$ | $0_H$ |
| $0_H$ | $2A_H$ | $2A_H$ |
| $2A_H$ | $0_H$ | $0_H$ |
| $2A_H$ | $0_H$ | $2A_H$ |
| $2A_H$ | $15_H$ | $0_H$ |
| $2A_H$ | $2A_H$ | $2A_H$ |
| $15_H$ | $15_H$ | $15_H$ |
| $15_H$ | $15_H$ | $3F_H$ |
| $15_H$ | $3F_H$ | $15_H$ |
| $15_H$ | $3F_H$ | $3F_H$ |
| $3F_H$ | $15_H$ | $15_H$ |
| $3F_H$ | $15_H$ | $3F_H$ |
| $3F_H$ | $3F_H$ | $15_H$ |
| $3F_H$ | $3F_H$ | $3F_H$ |

F I G. 6

| ADDRESS | DATA | ADDRESS | DATA | ADDRESS | DATA | ADDRESS | DATA |
|---|---|---|---|---|---|---|---|
| 00 | 0 | 10 | 7 | 20 | D | 30 | (F) |
| 01 | 1 | 11 | 8 | 21 | D | 31 | (F) |
| 02 | 1 | 12 | 8 | 22 | E | 32 | (F) |
| 03 | 1 | 13 | 9 | 23 | E | 33 | (F) |
| 04 | 1 | 14 | 9 | 24 | E | 34 | (F) |
| 05 | 2 | 15 | 9 | 25 | F | 35 | (F) |
| 06 | 2 | 16 | A | 26 | F | 36 | (F) |
| 07 | 2 | 17 | A | 27 | F | 37 | (F) |
| 08 | 3 | 18 | A | 28 | (F) | 38 | (F) |
| 09 | 3 | 19 | B | 29 | (F) | 39 | (F) |
| 0A | 3 | 1A | B | 2A | (F) | 3A | (F) |
| 0B | 4 | 1B | B | 2B | (F) | 3B | (F) |
| 0C | 4 | 1C | C | 2C | (F) | 3C | (F) |
| 0D | 4 | 1D | C | 2D | (F) | 3D | (F) |
| 0E | 5 | 1E | C | 2E | (F) | 3E | (F) |
| 0F | 6 | 1F | D | 2F | (F) | 3F | (F) |

(F): UNUSED

FIG. 7

| ADDRESS | DATA | ADDRESS | DATA | ADDRESS | DATA | ADDRESS | DATA |
|---|---|---|---|---|---|---|---|
| 00 | 0 | 10 | 7 | 20 | D | 30 | (F) |
| 01 | 1 | 11 | 8 | 21 | D | 31 | (F) |
| 02 | 1 | 12 | 8 | 22 | E | 32 | (F) |
| 03 | 1 | 13 | 9 | 23 | E | 33 | (F) |
| 04 | 1 | 14 | 9 | 24 | E | 34 | (F) |
| 05 | 2 | 15 | 9 | 25 | B | 35 | (F) |
| 06 | 2 | 16 | A | 26 | B | 36 | (F) |
| 07 | 2 | 17 | A | 27 | B | 37 | (F) |
| 08 | 3 | 18 | A | 28 | (F) | 38 | (F) |
| 09 | 3 | 19 | F | 29 | (F) | 39 | (F) |
| 0A | 3 | 1A | F | 2A | (F) | 3A | (F) |
| 0B | 4 | 1B | F | 2B | (F) | 3B | (F) |
| 0C | 4 | 1C | C | 2C | (F) | 3C | (F) |
| 0D | 4 | 1D | C | 2D | (F) | 3D | (F) |
| 0E | 5 | 1E | C | 2E | (F) | 3E | (F) |
| 0F | 6 | 1F | D | 2F | (F) | 3F | (F) |

(F): UNUSED

FIG. 8

| RED | BLUE | ADDRESS OF CONVERSION TABLE |
|---|---|---|
| 0 | 0 | 14 ($E_H$) |
| 0 | OTHER THAN 0 | 15 ($F_H$) |
| OTHER THAN 0 | 0 | 15 ($F_H$) |
| OTHER THAN 0 | OTHER THAN 0 | 16 ($10_H$) |

F I G. 9

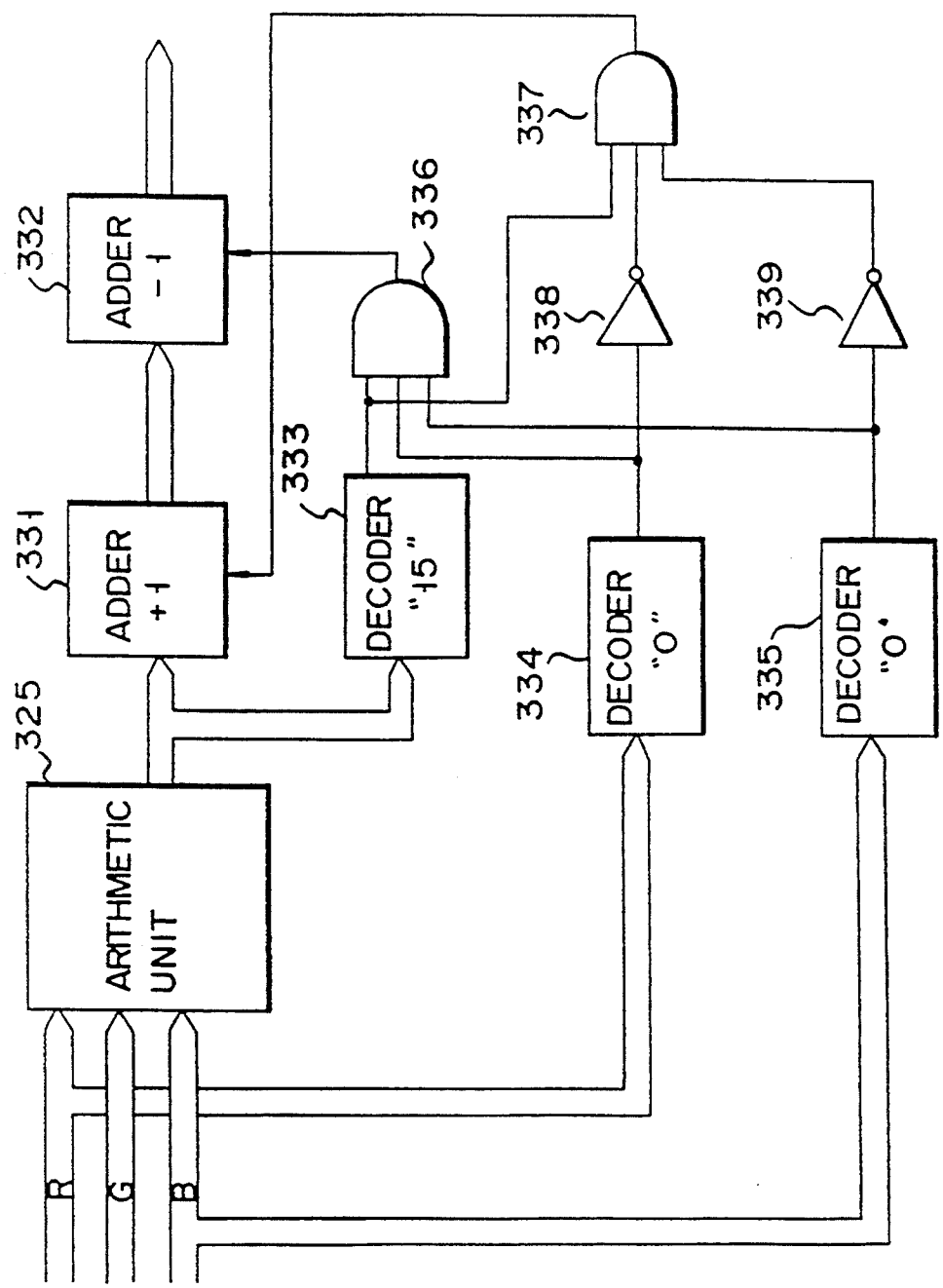
F I G. 10

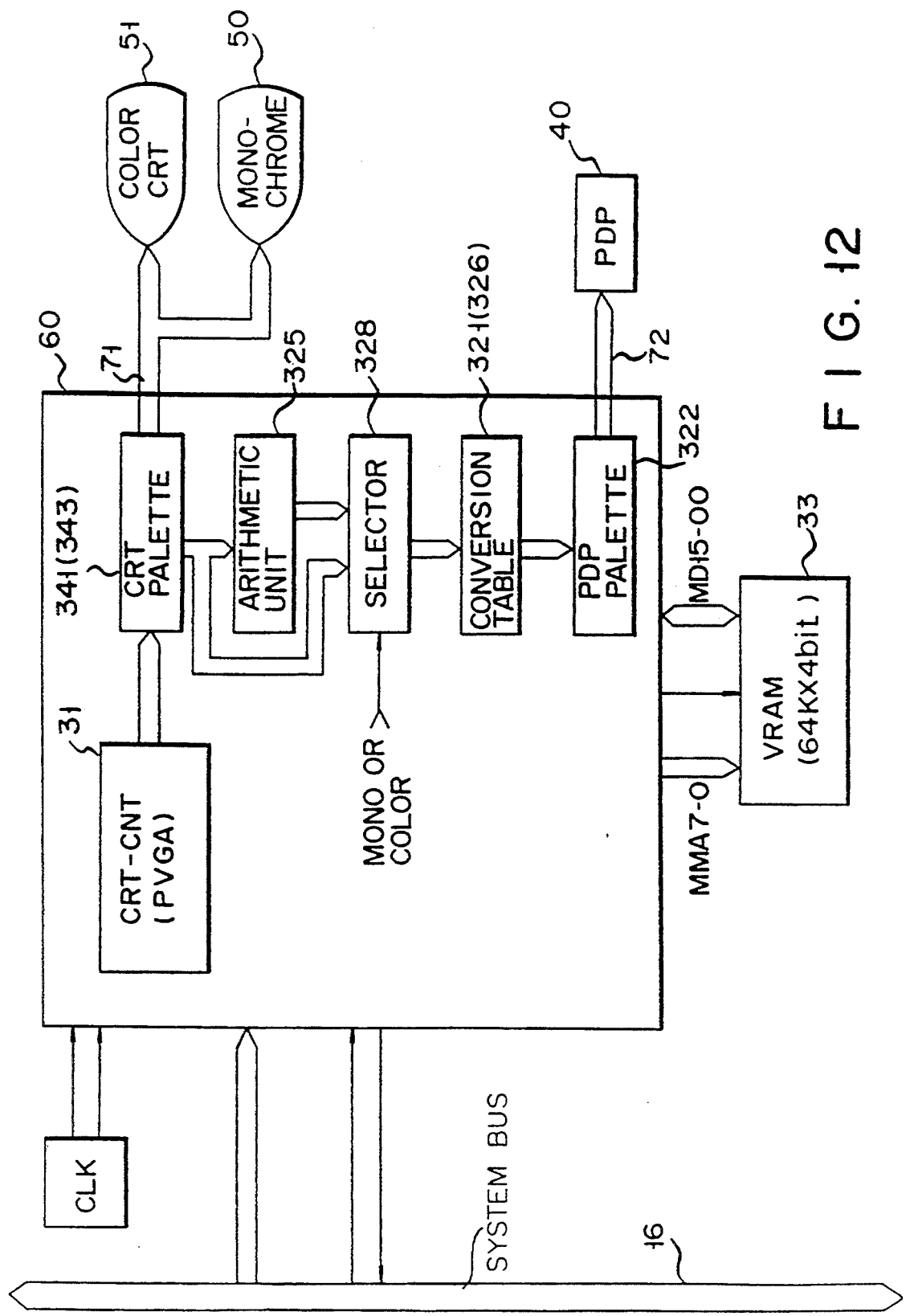
F I G. 12

DISPLAY CONTROL APPARATUS FOR CONVERTING COLOR/MONOCHROMATIC CRT GRADATION INTO FLAT PANEL GRADATION

This is a continuation of a continuation filed Jan. 21, 1993, a Ser. No. 08/007,023 which is now U.S. Pat. No. 5,293,485, which was a continuation of Ser. No. 07/406,066 filed Sep. 12, 1989, now abandoned.

BACKGROUND OF THE INVENTION

1. Field of the Invention

The present invention relates to a display control apparatus which includes a flat panel display unit (FDP) such as a plasma display unit as a standard I/O device and can be arbitrarily connected to a CRT display unit, and can be suitable for use in a computer system such as a personal computer and a personal workstation.

2. Description of the Related Art

Liquid crystal displays and plasma displays have been used as display units for conventional lap-top type personal computers and personal workstations. However, strong demand has arisen for running an application program created for a CRT display unit in the above computer so as to utilize a wealth of all previous software. For this reason, the above computer equipped with a plasma display unit as a standard I/O device is arranged to be connectable to a CRT display unit as an optional I/O device.

A CRT display unit multigradation palette (CRT palette) is different from a plasma display unit gradation designation (4 through 16 gradation levels) palette (PDP palette), and different palette values are set therein.

For this reason, when a CRT application program runs to dynamically update the CRT palette, the palette value of the PDP palette is not changed even if the CRT palette value is changed.

Similarly, in a system to which a CRT color display unit can be arbitrarily connected, different palette values are set in a color palette for designating display colors of the CRT color display unit and the PDP palette. Even if the palette value of the CRT palette is arbitrarily changed in accordance with a display color designated by CRT application software, the palette value of the PDP palette is not changed. For this reason, although a change in gradation or hue can be identified on the CRT display screen, the change cannot be reflected on the PDP, resulting in inconvenience.

SUMMARY OF THE INVENTION

It is an object of the present invention to provide a display control apparatus which can reflect a CRT display multicolor display (multigradation display) on a plasma display gradation display in an arrangement wherein a PDP palette value corresponding to a CRT palette value can be automatically written in a PDP palette by hardware upon updating of palette data of the CRT palette when a CPU executes application software.

According to a first aspect of the present invention, there is provided a display control apparatus in a system having a plasma display unit (PDP), comprising: CRT palette means in which CRT display unit gradation data is set; PDP palette means in which plasma display unit (PDP) gradation data is set; and PDP gradation data generating means for generating the plasma display unit gradation data from the CRT display unit gradation data set in the CRT palette means and outputting the plasma display unit gradation data to the PDP palette means.

According to a second aspect of the present invention, there is provided a display control apparatus in a system which is equipped with a plasma display unit as a standard I/O device capable of performing n-level gradation display and which can arbitrarily be connected to a monochromatic CRT display unit capable of performing an m-level (m>n) gradation display, comprising: CRT palette means in which monochromatic CRT display unit gradation data is set; PDP palette means in which plasma display unit (PDP) unit gradation data is set; and PDP gradation data generating means for generating the plasma display gradation data from the monochromatic CRT display unit gradation data set in the CRT palette means.

According to a third aspect of the present invention, there is provided a display control apparatus in a system having a plasma display unit, comprising: CRT palette means in which CRT display unit color data is set; PDP palette means in which plasma display unit (PDP) gradation data is set; and PDP gradation data generating means for generating the plasma display unit gradation data from the CRT display unit color data set in the CRT palette means.

According to a fourth aspect of the present invention, there is provided a display control apparatus in a system which is equipped with a plasma display unit as a standard I/O device capable of performing n-level gradation display and which can arbitrarily be connected to a color CRT display unit capable of performing an m-color (m>n) gradation display, comprising: CRT palette means in which color CRT display unit color data is set; PDP palette means which plasma display unit (PDP) gradation data is set; and PDP gradation data generating means for generating the plasma display unit gradation data from the color CRT display unit color data set in the CRT palette means.

According to a fifth aspect of the present invention, there is provided a display control apparatus in a system which is equipped with a plasma display unit as a standard I/O device capable of performing n-level gradation display and which can arbitrarily be connected to a monochromatic CRT display unit capable of performing an m-level (m>n) gradation display comprising: CRT palette means in which monochromatic CRT display unit gradation data or color CRT display unit color data is set; PDP palette means in which plasma display unit (PDP) gradation data is set; arithmetic means performing a predetermined arithmetic operation on the color data set in the CRT palette means and for outputting a gradation parameter; selecting means for receiving the gradation data from the CRT palette means or the gradation parameter from the arithmetic means, for outputting the gradation data when the monochromatic CRT display unit is connected, and for outputting the gradation parameter when the color CRT display unit is connected; and PDP gradation data generating means for generating the plasma display unit gradation data on the basis of the gradation data or the gradation parameter which is output from the selecting means.

According to a sixth aspect of the present invention, a display control LSI constituted by highly integrated semiconductor elements, comprising: a CRT palette in which monochromatic CRT display unit gradation data or color CRT display unit color data is set; a PDP palette in which plasma display unit (PDP) gradation data is set; arithmetic means for performing a predetermined arithmetic operation of the color data set in the CRT palette and outputting a gradation parameter; selecting means for receiving the gradation data from the CRT palette or the gradation parameter from the arithmetic means, for outputting the gradation data when the monochromatic CRT display unit is connected, and for outputting the gradation parameter when the color CRT display unit is connected; a conversion table for storing a correspondence between the plasma display unit gradation data and the CRT display unit gradation data from the CRT palette or the gradation parameter from the arithmetic means and outputting the plasma display unit gradation data on the basis of the gradation data or the parameter output from the selecting means; first output means for outputting the gradation data or the color data set in the CRT palette; and second output means for outputting the gradation data set in the PDP palette.

BRIEF DESCRIPTION OF THE DRAWINGS

FIG. 2 is a block diagram showing a detailed arrangement of a display control apparatus shown in FIGS. 1A and 1B according to an embodiment of the present invention;

FIGS. 3 and 4 are tables showing the contents (i.e., correspondence between the CRT and PDP gradation data) of a conversion table shown in FIG. 2;

FIG. 6 is a table showing R, G, and B values output from a CRT palette in the embodiment shown in FIG. 5;

FIGS. 7 and 8 are tables showing the contents (i.e., correspondence between the CRT and PDP gradation data) of a conversion table shown in FIG. 5;

FIG. 9 is a table for assigning different gradation data to the same gradation parameter in FIG. 8;

FIG. 10 is a circuit diagram showing a hardware arrangement for realizing the contents of the table shown in FIG. 9;

FIG. 12 is a block diagram of a display control apparatus according to still another embodiment of the present invention.

DETAILED DESCRIPTION OF THE PREFERRED EMBODIMENTS

Figure 1A:
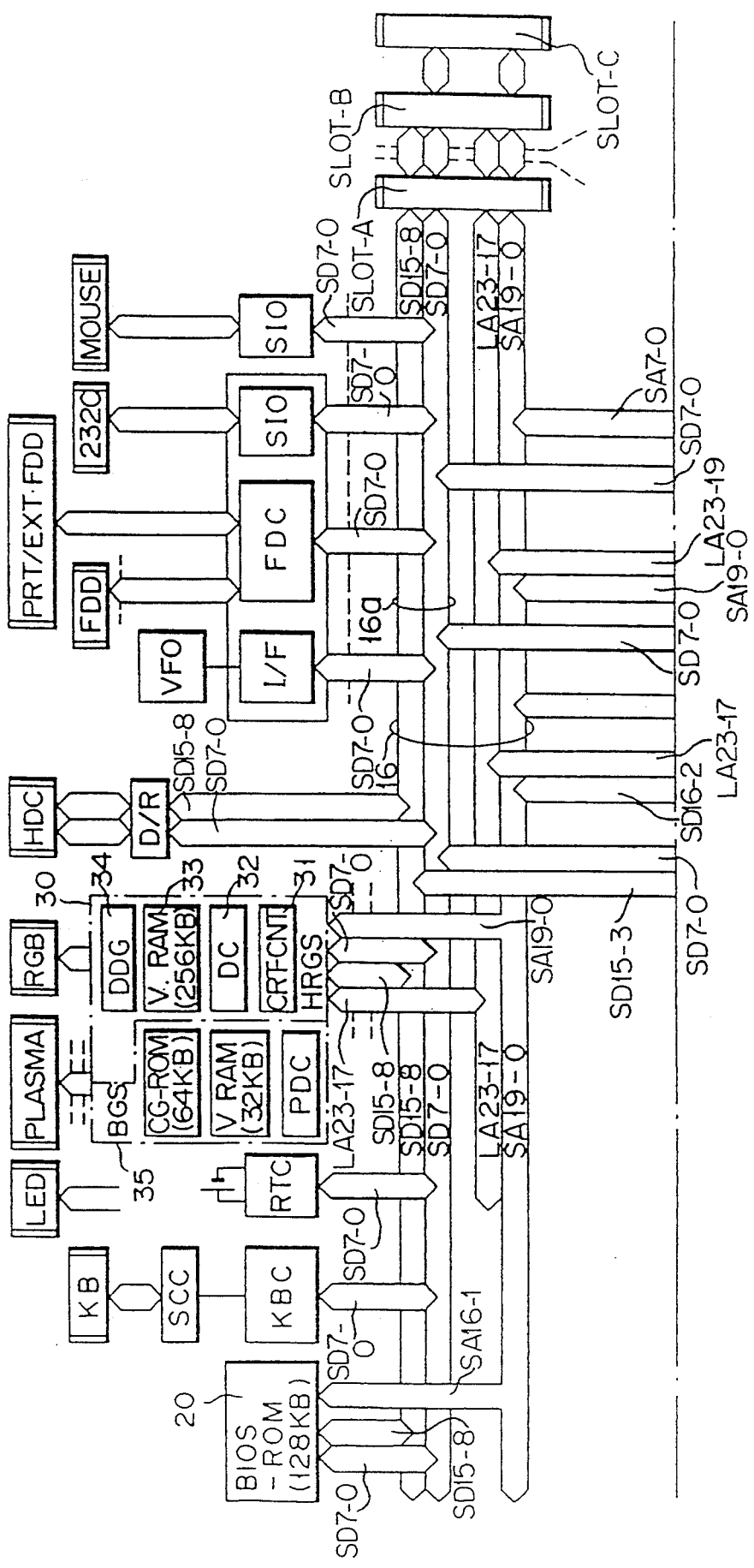
FIGS. 1A and 1B form a block diagram showing the overall arrangement of a computer system which employs the present invention.
Figure 1B:
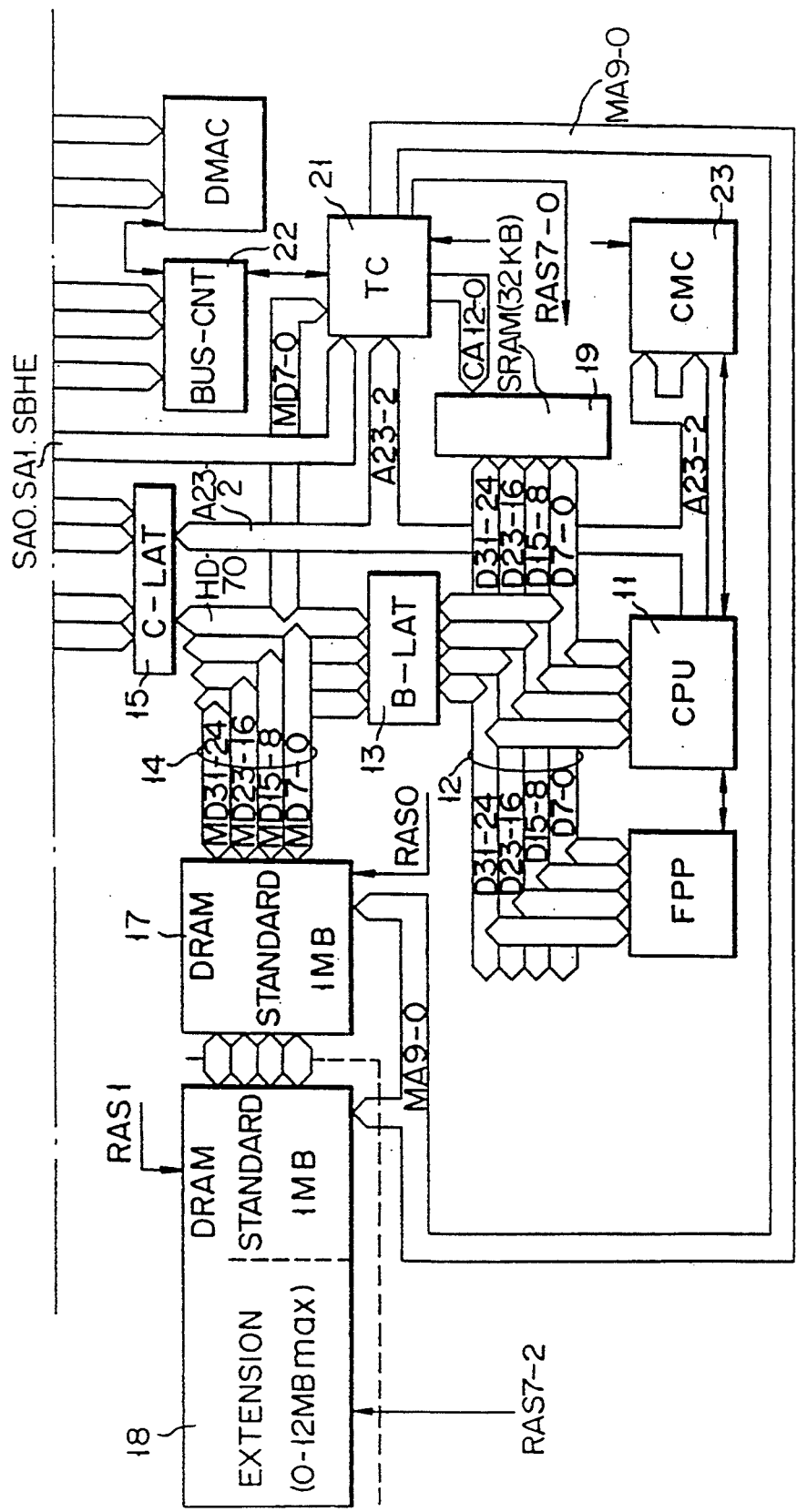

FIGS. 1A and 1B form a block diagram showing an overall arrangement of, e.g., a lap-top type personal computer. Referring to FIGS. 1A and 1B, element 11 is a central processing unit (CPU) for controlling the overall system. Element 12 is a 32-bit data bus (D31—D24, D23—D16, D15—D8, D7—D0). Element 13 is a latch circuit (B-LAT) for latching data on the data bus 12. Element 14 is a 32-bit memory bus (MD31—MD24, MD23—MD16, MD15—MDS, MD7—MD0). Element 16 is a system bus consisting of 16- and 7-bit address buses (SA19—SA0, LA23—LA17) and a 16-bit data bus (SD15—SD8, SD7—SD0) 16a. Element 15 is a latch circuit (C-LAT) for latching address data on the address bus (SA1-9—SA0, LA23—LA17) and data on the data bus (SD15—SDS, SD7—SD0) 16a. Elements 17 and 18 comprise internal dynamic random access memories (DRAMs), respectively, backed-up with batteries. Element 19 is a cache memory, and an element 20 is an internal ROM (BIOS-ROM) for storing a basic input and output system program. The BIOS-ROM 20 stores and designates CRT display timing data set by a CRT controller 31 (to be described later).

Element 21 is a timing controller (TC) for performing timing control of the overall system including memory control timings. Element 22 is a bus controller (BUS-CNT) for controlling the system bus 16. Element 23 is a cache memory controller (CMC) for controlling the cache memory 19.

Element 30 is a high-resolution display system (HRGS: High Resolution Graphic Subsystem) having a display control function for driving the CRT display at a high resolution (720 dots in the horizontal direction) with multilevel gradation (64 gradation levels) and a display control function for simultaneously driving CRT and plasma display units (in this case, each display unit has a horizontal display resolution of 640 dots). The HRGS 30 can be arbitrarily connected to the display control apparatus. A CRT display unit can be arbitrarily connected to the HRGS 30 through a connector C1 (not shown in FIGS. 1A and 1B). Element 35 is a display system (BGS) for driving a plasma display unit (PDP). The plasma display unit PDP is connected to the BGS 35 through a connector C2 (not shown in FIGS. 1A and 1B). Note that the plasma display unit is a standard I/O device and is kept connected to the connector C2.

Elements SL1 and SL2 are extended slots (SLOT-B and SLOT-C) capable of connecting various types of extended boards including a display adapter board.

FIG. 2 is a block diagram showing a detailed arrangement of the HRGS 30 shown in FIG. 1A. Element 31 is a CRT display controller (CRT-CNT) for driving a CRT display unit 50 at a high resolution (720 dots) with multilevel gradation (64 gradation levels). The CRT controller 31 described above may adopt PVGA1 available from Paradise, U.S.A. The CRT-CNT 31 includes a decoder 311. The decoder 311 decodes a port address of a CRT palette 341 and outputs a write signal to the CRT palette 341.

A display controller 32 has a bus interface function for exchanging various display control data with the CPU 11 through the system bus 16 and a function for controlling the display operation of a plasma display unit (PDP) 40 and is constituted by one chip of, e.g., a programmable logic array (PLA). The display controller 32 includes a conversion table 321.

FIG. 3 shows the contents of the conversion table 321.

In this embodiment, monochromatic CRT display gradation data (64 gradation levels) is used as an address for accessing the conversion table 321. That is, values from address "00" (hexadecimal notation) to "3F" correspond to palette data (in this case, 64 gradation values) of the CRT display. Values of 16 gradation levels from "0" to "F" are assigned to the plasma display so as to correspond to the address values from "00" to "3F".

The display controller 32 comprises a PDP palette 322 for generating gradation data and a decoder 323. The decoder 323 has the same arrangement as that in the CRT-CNT 31. More specifically, the decoder 323 decodes a port address of the CRT palette 341 and generates an output as a write signal for the PDP palette 322. In this embodiment, the decoders 323 and 311 are separate decoders. However, only one decoder 311 may be arranged to supply its output as a write signal to the CRT and PDP palettes 341 and 322.

In this embodiment, the display controller 32 is constituted by one chip of highly integrated semiconductor elements.

Referring to FIG. 2, a display data memory (to be referred to as a VRAM hereinafter) 33 has, e.g., a 64×4 bit capacity and stores the display data. A CRT display data generator 34 serves as a CRT display data generator for generating analog display data under control of the CRT display controller 31. The CRT display data generator (DDG) 34 includes the CRT palette 341, and a digital-to-analog (D/A) converter 342. A 16-bit data bus (SD15—SD00) 61 transfers various data including updating palette data between the system bus 16 and the display controller 32. A data bus 62 is a data bus (SD7—SD0) for writing the palette data in the CRT palette 341 in the CRT display data generator 34.

An operation of this embodiment will be described below.

The CRT-CNT 31 reads out display data (in this embodiment, since a monochromatic CRT is used, 16-level gradation data is read out) from the VRAM 33 and writes the readout data in the CRT palette 341 in the CRT display data generator 34 through the internal bus (VD7—VD0). The CRT palette 341 converts 16-level gradation information into 64-level gradation information. The 64-level gradation information is converted into analog display data by the D/A converter 342, and the analog data is output to the CRT display unit 50. As a result, the CRT display unit 50 displays image data at a gradation level designated by the CRT palette 341.

The 64-level gradation information is supplied to the conversion table 321 in the display controller 32 through the data bus (SD7—SD0) 62. The conversion table 321 outputs plasma display gradation information corresponding to the input gradation information to the PDP palette 322. As a result, the PDP 40 performs a display operation in accordance with gradation information (one of gradation level 0 through gradation level 15) set in the PDP palette 322.

The conversion table 321 is programmable under the control of the CPU 11. The PDP 40 generally has a luminance level lower than that of the CRT display unit 50. When the display luminance of the PDP is set to be equal to that of the CRT, the PDP luminance in the normal operation is lowered, and the contents on the display screen cannot easily be recognized. In the PDP 40, a difference between the normal gradation level and the high gradation level is relatively small and cannot be clearly confirmed on the PDP 40. In order to solve the above problem, the contents of the conversion table 321 are updated so that data displayed with a normal luminance on the CRT display unit 50 is displayed to have the highest luminance level on the PDP 40 since the PDP luminance level is generally lower than the CRT luminance level. FIG. 4 shows the contents of the conversion table 321 for this purpose. Referring to FIG. 3, each of gradation data at addresses 25 through 28 is "B". However, in the conventional table shown in FIG. 4, each of the gradation data at addresses 25 through 28 is given as "F". Although each of gradation data at addresses 39 to 3F in FIG. 3 is given as "F", each of the gradation data in the conversion table in FIG. 4 is "B". Write content setup of the conversion table 321 is performed such that the contents pre-stored in the BIOS-ROM 20 are read out and set in the table through the system bus 16. It is possible for a user to arbitrarily update the contents of the conversion table 321.

A second embodiment will be described with reference to FIGS. 5 through 10. The same reference numerals as in FIG. 2 denote the same parts in FIGS. 5 through 10, and a detailed description thereof will be omitted. Although the first embodiment exemplifies a system connected to a monochromatic CRT display unit to generate PDP palette data from CRT palette data by hardware, the second embodiment exemplifies a system connected to a color CRT display unit to generate PDP palette data from CRT palette data.

Figure 5:
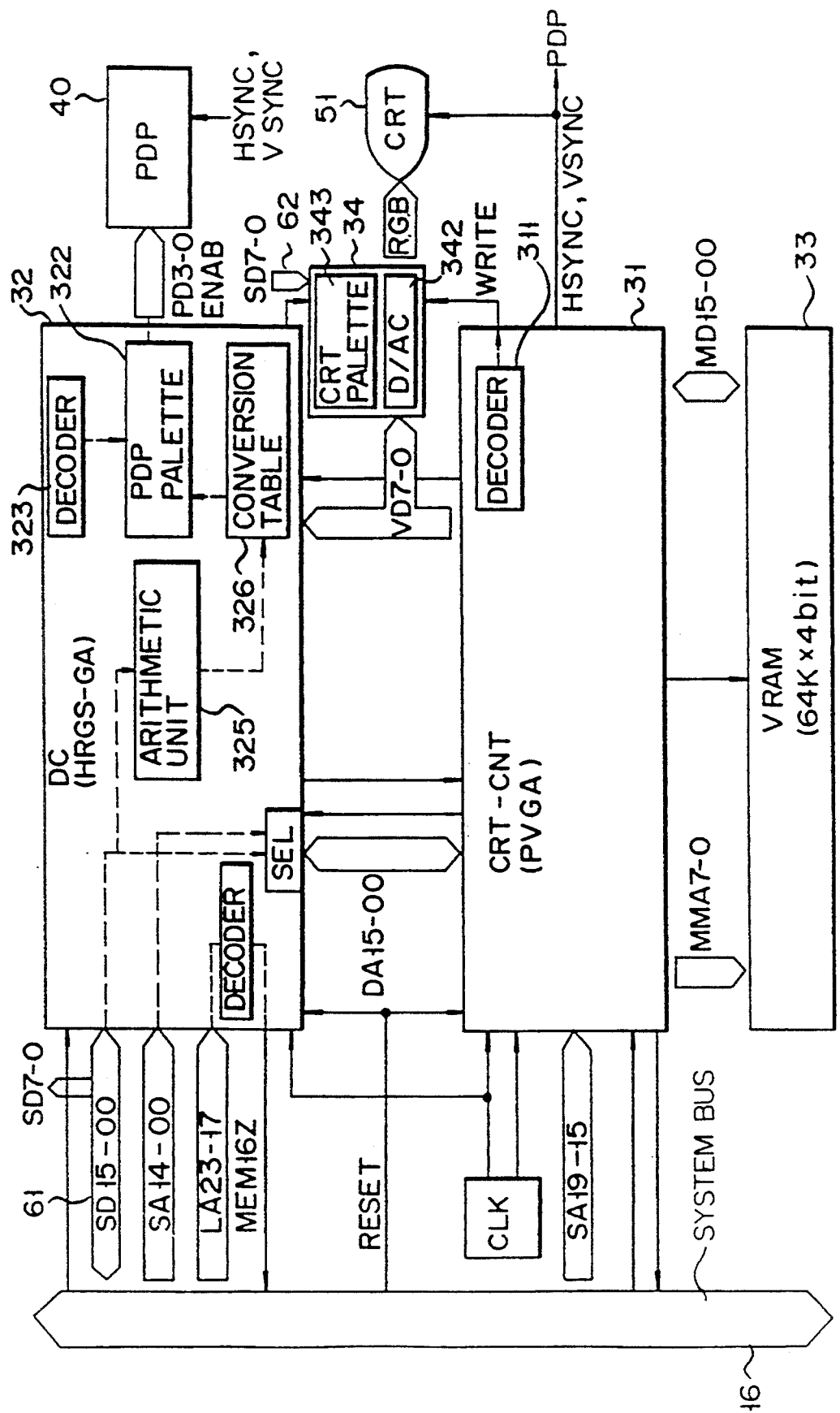
FIG. 5 is a block diagram showing a detailed arrangement of a display control apparatus according to another embodiment of the present invention.

As shown in FIG. 5, a display controller 32 includes an arithmetic unit 325. The arithmetic unit 325 comprises, e.g., a programmable logic array and performs a predetermined arithmetic operation of palette data (FIG. 6) supplied from a CRT palette 343 through a data bus (SD7—SD0) 62 to output 39 gradation parameters. A conversion table 326 is arranged to output 16 gradation data corresponding to 39 gradation parameters.

An operation of the second embodiment will be described below.

A CRT-CNT 31 reads out display data (since a color CRT is used in this embodiment, 16 color data are read out) from a VRAM 33, and the readout data are written in the CRT palette 343 in a CRT display data generator 34 through an internal bus (VD7—VD0). The color CRT palette 343 converts 16 color data into 262,141 color tone data (=64 colors×(R, G, and B components)). The 262,144 color tone data are converted into analog display data by a D/A converter 342, and analog display data are output to a color CRT display unit 51. As a result, image data represented by color information designated by the CRT palette 343 is displayed on the color CRT display unit 51.

The 64 data of each of the R, G, and B components are supplied to the arithmetic unit 325 in the display controller 32 through the data bus (SD7—SD0). The arithmetic unit 325 calculates gradation parameters on the basis of equations (1) and (2).

A gradation intensity is calculated by equation (1):

Gradation Intensity = (3 × red data) + (6 × green data) + (1 × blue data)     (1)

The gradation parameter is calculated by equation (2) using the above gradation intensity:

Gradation Parameter = (gradation intensity)/16
(the decimal part is rounded off)

The 262,144 color tone data supplied from the CRT palette 343 are converted into 39 gradation parameters by the arithmetic unit 325. These 39 gradation parameters are input to the color conversion table 326. The conversion table 326 is arranged, as shown in FIG. 7. Addresses "00" (hexadecimal notation) through "27" correspond to gradation parameters 0 through 39, respectively.

The color conversion table 326 outputs gradation data (gradation level 0 through gradation level 15) corresponding to the input gradation parameters to the a PDP palette 322. As a result, a PDP 40 performs a display in accordance with gradation data (one of gradation level 0 to gradation level 15) set in the PDP palette 322.

If the R, G, and B components are given as i) "0(H)", "2A(H)", and "0(H)", ii) "2A(H)", "15(H)", and "0(H)", and iii) "15(H)", "15(H)", and "3F(H)" the gradation parameter values are given as "15". It is impossible to set R, G, and B values except for "15" because CRT application software must be modified. When a color CRT is used, R, G, and B values are different from each other and displayed in different colors. When these values are displayed on the plasma display, they are displayed on the same gradation In order to eliminate this drawback, when both the R B values are set to be "0", as shown in FIG. 9, the version table address is set to "14". However, when both the R and B values are set to values except for "0", the address of the conversion table is set to "16" Otherwise, the address is set to "15". A hardware arrangement of this address setup is shown in FIG. 10.

Referring to FIG. 10, the R, G, and B values are input to an arithmetic unit 325. The R value is input to a decoder 334, and the B value is input to a decoder 335. The arithmetic unit 325 calculates the gradation parameters of the R, G, and B values ("0(H)", "2A(H)", and "0(H)"; "2A(H)", "15(H)", and "0(H)"; and "15(H)", "15(H)", and "3F(H)") to obtain "15". The value of "15" is supplied to an adder 331 and a decoder 333. If a value input to the decoder 333 is "15", the decoder 333 outputs a signal of logic "1". Similarly, when values input to the decoders 334 and 335 are "15", they output signals of logic "1". The output values from the decoders 333, 334, and 335 are input to an AND gate 336. The output from the decoder 333, an output obtained by inverting the output from the decoder 334 through an inverter 338, and an output obtained by inverting the output from the decoder 335 through an inverter 339 are supplied to an AND gate 337. The AND gate 336 supplies an enable signal to an adder (−1) 332 when the output from the arithmetic unit 325 is "15" and both the R and B values are set to "0", As a result, the adder (−1) 332 outputs a value of "14".

When the output from the arithmetic unit 325 is "15" and neither the R nor B values are "0", the AND gate 337 outputs an enable signal to the adder (+1) 331. As a result, the adder (+1) 331 outputs a value of "16". Otherwise, the arithmetic unit 325 outputs the value of "15".

In this manner, even if the gradation parameters are the same value of "15", the CRT-BIOS need not be modified, and the data can be displayed on the PDP at different gradation levels. In the second embodiment, the PDP palette 322 is write-accessed in synchronism with write access of the CRT palette 343 by decoders 311 and 323. The contents of the color conversion table 326 are programmable in the same manner as in the first embodiment. In this case, gradation data corresponding to addresses "19", "1A" and "1B" is "B" in FIG. 7. However, these gradation data in the conversion table in FIG. 8 are set to "F". Although the gradation data corresponding to addresses "25", "26", and "27" are "F" in FIG. 7, these gradation data are set to "B" in FIG. 8.

The contents of the conversion table can be modified by the user during system operation in the same manner as in the first embodiment.

Figure 11:
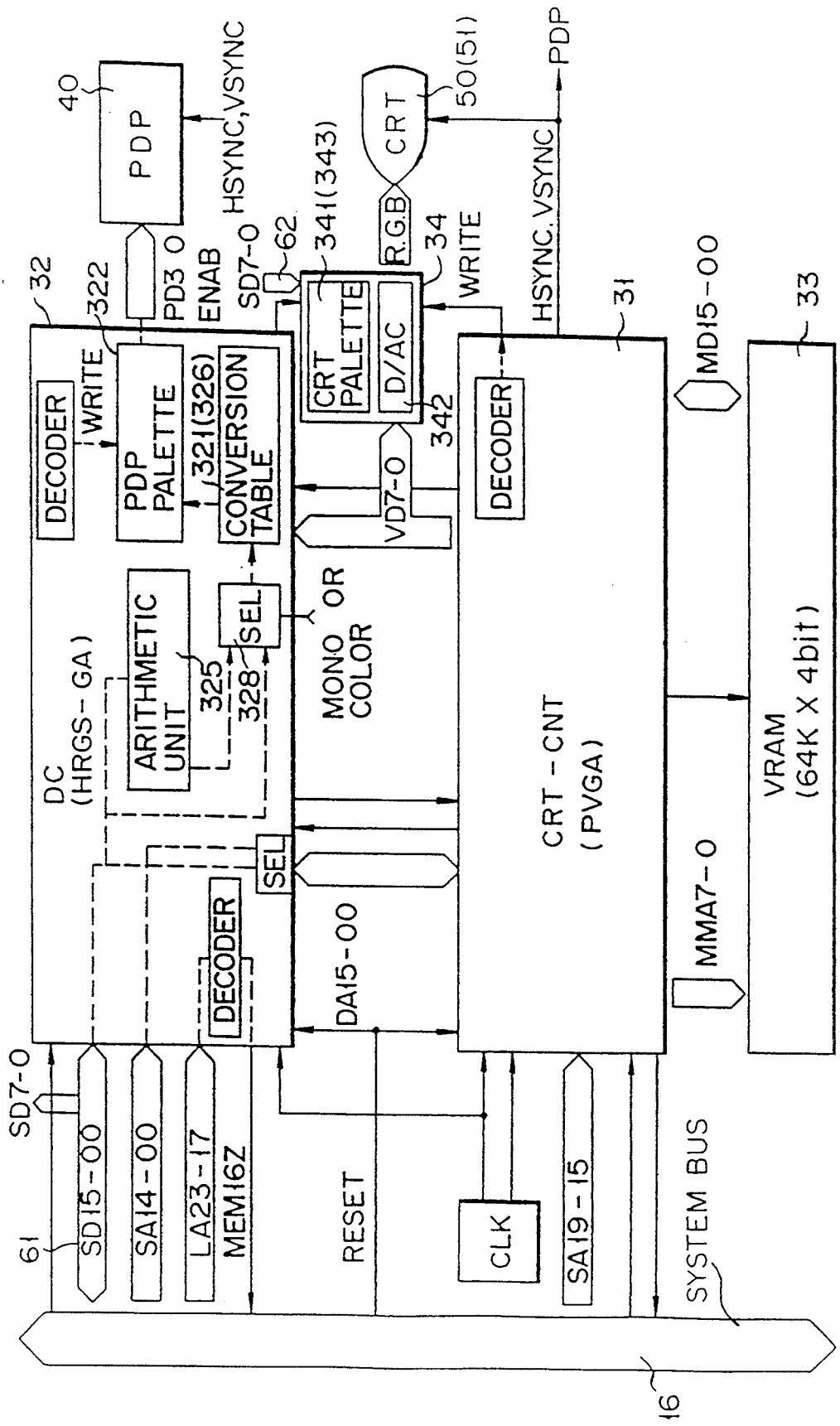
FIG. 11 is a block diagram showing a detailed arrangement of a display control apparatus according to still another embodiment of the present invention.

A third embodiment will be described with reference to FIG. 11.

The first and second embodiments exemplify the display controllers 32 which incorporate the monochromatic CRT and the color CRT, respectively. The embodiment shown in FIG. 11 exemplifies an arrangement of a display control apparatus to which a color CRT 51 or a monochromatic CRT 50 is arbitrarily connected. In this embodiment, the table contents corresponding to the monochromatic CRT or the color CRT are read out from a BIOS-ROM 20 and set in a conversion table 321 (326) in accordance with the currently connected display.

The display controller 32 includes a selector 328. The selector 328 inputs gradation information supplied from a CRT palette 341 (343) and a gradation parameter output from an arithmetic unit 325 to selectively output selection information representing that the monochromatic CRT 50 or the color CRT 51 is connected to the apparatus. More specifically, when the monochromatic CRT 50 is connected, the gradation data supplied from the CRT palette 341 is output to the conversion table 321. However, when the color CRT 51 is connected to the apparatus, the gradation parameter output the arithmetic unit 325 is output to the conversion table 326. With the above arrangement, even if the monochromatic or color CRT is connected, a single display control apparatus can automatically generate PDP palette data from the CRT palette data by hardware without modifying the CRT BIOS and monochromatic or color application software.

A fourth embodiment will be described below.

FIG. 12 is a block diagram of a display control LSI 160 constituted by one chip of highly integrated semiconductor elements such as a CRT controller 31, a CRT palette 341 (343), an arithmetic unit 325, a selector 328, a conversion table 321 (326), and a PDP palette 322. The display control LSI 160 has a terminal 71 for outputting a display color signal or a gradation signal from the CRT palette 341 (343) and a terminal 72 for outputting a gradation signal supplied from the PDP palette 322. With this arrangement, when data is to be displayed on only the PDP 40, or when data is displayed on both the color CRT 51 or the monochromatic CRT 50 and the PDP 40, the design can be facilitated without modifying the CRT-BIOS and CRT application software.

What is claimed is:

1. A display control large scale integrated (LSI) circuit constituted by highly integrated semiconductor elements, comprising:
   a CRT palette means for storing one of monochromatic CRT display unit gradation data and color CRT display unit color data;
   arithmetic means for performing a predetermined arithmetic operation on the color CRT display unit color data stored in said CRT palette means, and for outputting a gradation parameter corresponding to flat panel display (FPD) unit gradation data;
   selecting means, coupled to said arithmetic means, for receiving one of the monochromatic CRT display unit gradation data from said CRT palette means and the gradation parameter from said arithmetic means, and for outputting the monochromatic CRT display unit gradation data to a monochromatic CRT display unit, and for outputting the gradation parameter to a color CRT display unit;
   first output means, coupled to the CRT palette means, for outputting one of the monochromatic CRT display unit gradation data and the color CRT display unit color data stored in said CRT palette means; and second output means, coupled to the selecting means, for outputting one of the monochromatic CRT display unit gradation data stored in said CRT palette means and the FPD unit gradation data corresponding to the gradation parameter from said arithmetic means.

2. A display control large scale integrated (LSI) circuit constituted by highly integrated semiconductor elements, comprising:

a CRT palette storing one of monochromatic CRT display unit gradation data and color CRT display unit color data;

arithmetic unit performing a predetermined arithmetic operation on the color CRT display unit color data stored in said CRT palette, and outputting a gradation parameter corresponding to flat panel display (FPD) unit gradation data;

selector, coupled to said arithmetic unit, receiving one of the monochromatic CRT display unit gradation data from said CRT palette and the gradation parameter from said arithmetic unit, and outputting the monochromatic CRT display gradation data when a monochromatic CRT display unit is connected, and outputting the gradation parameter when a color CRT display unit is connected;

first output terminal, coupled to the CRT palette, outputting one of the monochromatic CRT display unit gradation data and the color CRT display unit color data stored in said CRT palette; and second output terminal, coupled to said selector, outputting one of the monochromatic CRT display unit gradation data stored in said CRT palette and the FPD unit gradation data corresponding to the gradation parameter from said arithmetic unit.

3. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

a CRT palette storing one of monochromatic CRT display unit gradation data and color CRT display unit color data and outputting one of the monochromatic CRT display unit gradation data and the color CRT display unit color data to one of said monochromatic CRT display unit and the color CRT display unit;

an arithmetic unit performing a predetermined arithmetic operation on the color CRT display unit color data stored in said CRT palette, and outputting a gradation parameter corresponding to FPD unit gradation data; and a selector, coupled to said arithmetic unit, receiving one of the monochromatic CRT display unit gradation data from said CRT palette and the gradation parameter from said arithmetic unit, and outputting the monochromatic CRT display unit gradation data when said monochromatic CRT display unit is connected, and outputting the FPD unit gradation data corresponding to the gradation parameter when said color CRT display unit is connected.

4. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

CRT palette means for storing one of monochromatic CRT display unit gradation data and color CRT display unit color data and for outputting one of the monochromatic CRT display unit gradation data and the color CRT display unit color data to one of said monochromatic CRT display unit and the color CRT display unit;

arithmetic means for performing a predetermined arithmetic operation on the color CRT display unit color data stored in said CRT palette means, and for outputting a gradation parameter corresponding to FPD unit gradation data; and selector means, coupled to said arithmetic unit, for receiving one of the monochromatic CRT display unit gradation data from said CRT palette means and the gradation parameter from said arithmetic means, and for outputting the monochromatic CRT display unit gradation data when said monochromatic CRT display unit is connected, and for outputting the FPD unit gradation data corresponding to the gradation parameter from said arithmetic means when said color CRT display unit is connected.

5. A display control system, comprising:

a flat panel display (FPD) unit performing an n-level gradation display;

a color CRT display unit or a monochromatic CRT display unit for performing an m-level (m>n) gradation display;

a CRT palette storing one of monochromatic CRT display unit gradation data and color CRT display unit color data and outputting one of the monochromatic CRT display unit gradation data and the color CRT display unit color data to one of said monochromatic CRT display unit and the color CRT display unit;

an arithmetic unit performing a predetermined arithmetic operation on the color CRT display unit color data stored in said CRT palette, and outputting a gradation parameter corresponding to FPD unit gradation data;

a selector, coupled to said arithmetic unit, receiving one of the monochromatic CRT display unit gradation data from said CRT palette and the gradation parameter from said arithmetic unit, and outputting to the FPD unit the monochromatic CRT display unit gradation data when said monochromatic CRT display unit is connected, and outputting the FPD unit gradation data corresponding to the gradation parameter from said arithmetic unit.

6. A display control system, comprising:

a flat panel display (FPD) unit performing an n-level gradation display;

a color CRT display unit or a monochromatic CRT display unit performing an m-level (m>n) gradation display;

CRT palette means for storing one of monochromatic CRT display unit gradation data and color CRT display unit color data and for outputting one of the monochromatic CRT display unit gradation data and the color CRT display unit color data to one of said monochromatic CRT display unit and the color CRT display unit;

arithmetic means for performing a predetermined arithmetic operation on the color CRT display unit color data stored in said CRT palette means, and for outputting a gradation parameter corresponding to FPD unit gradation data;

selecting means, coupled to said arithmetic means, for receiving one of the monochromatic CRT display unit gradation data from said CRT palette means and the gradation parameter from said arithmetic means, and for outputting to the FPD unit the monochromatic CRT display unit gradation data when said monochromatic CRT display unit is connected, and for outputting the FPD unit gradation data corresponding to the gradation parameter from said arithmetic means when said color CRT display unit is connected.

7. A display control large scale integrated (LSI) circuit constituted by highly integrated semiconductor elements, comprising:

a CRT palette storing color CRT display unit color data;

an arithmetic unit performing a predetermined arithmetic operation on the color CRT display unit color data stored in said CRT palette and outputting a gradation parameter corresponding to flat panel display (FPD) unit gradation data; and a conversion table storing a correspondence between the FPD unit gradation data and the gradation parameter from said arithmetic unit, and outputting the FPD unit gradation data in accordance with the gradation parameter output from said arithmetic unit;

a first output terminal, coupled to said CRT palette, outputting the color CRT display unit color data stored in said CRT palette; and a second output terminal, coupled to said conversion table, outputting the FPD unit gradation data output from said conversion table.

8. A display control large scale integrated (LSI) circuit constituted by highly integrated semiconductor elements, comprising:

CRT palette means for storing color CRT display unit color data;

arithmetic means for performing a predetermined arithmetic operation on the color CRT display unit color data stored in said CRT palette means and for outputting a gradation parameter corresponding to flat panel display (FPD) unit gradation data; and FPD unit gradation data generating means for generating the FPD unit gradation data on the basis of the gradation parameter output from said arithmetic means;

first output means, coupled to said CRT palette means, for outputting the color CRT display unit color data stored in said CRT palette means; and second output means, coupled to said FPD unit gradation data generating means, for outputting the FPD unit gradation data output from said FPD unit gradation data generating means.

9. A display control apparatus in a system which includes a flat panel display (FPD) unit as a standard I/O device for performing an n-level gradation display and which can arbitrarily be connected to a color CRT display unit for performing an m-level (m>n) gradation display, the display control apparatus comprising:

a CRT palette storing color CRT display unit color data;

an arithmetic unit performing a predetermined arithmetic operation on the color CRT display unit color data stored in said CRT palette, and outputting a gradation parameter corresponding to FPD unit gradation data; and a conversion table storing a correspondence between the FPD unit gradation data and the gradation parameter from said arithmetic unit, and outputting the FPD unit gradation data in accordance with the gradation parameter output from said arithmetic unit.

10. A display control apparatus in a system which includes a flat panel display (FPD) unit as a standard I/O device for performing an n-level gradation display and which can arbitrarily be connected to a color CRT display unit for performing an m-level (m>n) gradation display, the display control apparatus comprising:

CRT palette means for storing color CRT display unit color data;

arithmetic means for performing a predetermined arithmetic operation on the color CRT display unit color data stored in said CRT palette means, and for outputting a gradation parameter corresponding to FPD unit gradation data; and FPD unit gradation data generating means, coupled to said arithmetic means, for generating the FPD unit gradation data on the basis of the gradation parameter output from said arithmetic means, and for outputting the FPD unit gradation data to said FPD unit.

11. A display control system, comprising:

a flat panel display (FPD) unit performing an n-level gradation display;

a color CRT display unit or a monochromatic CRT display unit for performing an m-level (m>n) gradation display;

a CRT palette storing color CRT display unit color data and outputting the color CRT display unit color data to said color CRT display unit;

an arithmetic unit performing a predetermined arithmetic operation on the color CRT display unit color data stored in said CRT palette, and outputting a gradation parameter corresponding to FPD unit gradation data; and a conversion table storing a correspondence between the FPD unit gradation data and the gradation parameter from said arithmetic unit, and outputting the FPD unit gradation data output from said conversion table to said FPD unit.

12. A display control system, comprising:

a flat panel display unit (FPD) performing an n-level gradation display;

a color CRT display unit or a monochromatic CRT display unit for performing an m-level (m>n) gradation display;

CRT palette means for storing color CRT display unit color data and for outputting the color CRT display unit color data to said color CRT display unit;

arithmetic means for performing a predetermined arithmetic operation on the color CRT display unit color data stored in said CRT palette means, and for outputting a gradation parameter corresponding to FPD unit gradation data; and FPD unit gradation data generating means, coupled to said arithmetic means, for generating the FPD unit gradation data on the basis of the gradation parameter output from said arithmetic means, and for outputting the FPD unit gradation data output from said FPD unit gradation data generating means to said FPD unit.

13. A display control large scale integrated (LSI) circuit constituted by highly integrated semiconductor elements, comprising:
- a CRT palette storing one of monochromatic CRT display unit gradation data and color CRT display unit color data;
- an arithmetic unit performing a predetermined arithmetic operation on the color CRT display unit color data stored in said CRT palette, and for outputting a gradation parameter corresponding to flat panel display (FPD) unit gradation data;
- a selector, coupled to said arithmetic unit, for receiving one of the monochromatic CRT display unit gradation data from said CRT palette and the gradation parameter from said arithmetic unit, and for outputting the monochromatic CRT display gradation data when said monochromatic CRT display unit is connected, and for outputting the gradation parameter when said color CRT display unit is connected;
- a conversion table storing a correspondence between the FPD unit gradation data and one of the monochromatic CRT display unit gradation data stored in said CRT palette and the gradation parameter output from said selector, and outputting the FPD unit gradation data in accordance with one of the monochromatic CRT display unit gradation data and the gradation parameter output from said arithmetic unit;
- first output terminal, coupled to said-CRT palette, outputting one of the monochromatic CRT display unit gradation data and the color CRT display unit color data stored in said CRT palette; and
- second output terminal, coupled to said conversion table, outputting the FPD unit gradation data output from said conversion table.

14. A display control large scale integrated (LSI) circuit constituted by highly integrated semiconductor elements, comprising:
- CRT palette means for storing one of monochromatic CRT display unit gradation data and color CRT display unit color data;
- arithmetic means for performing a predetermined arithmetic operation on the color CRT display unit color data stored in said CRT palette means, and for outputting a gradation parameter corresponding to flat panel display (FPD) unit gradation data;
- selecting means, coupled to said arithmetic means, for receiving one of the monochromatic CRT display unit gradation data from said CRT palette means and the gradation parameter from said arithmetic means, and for outputting the monochromatic CRT display gradation data when a monochromatic CRT display unit is connected, and for outputting the gradation parameter when a color CRT display unit is connected;
- FPD unit gradation data generating means, coupled to said arithmetic means, for generating the FPD unit gradation data on the basis of one of the monochromatic CRT display unit gradation data and the gradation parameter output from said selecting means, and for outputting the FPD unit gradation data output from said FPD unit gradation data generating means;
- first output means, coupled to said CRT palette means, for outputting one of the monochromatic CRT display unit gradation data and the color CRT display unit color data stored in said CRT palette; and
- second output means, coupled to said FPD unit gradation data generating means, for outputting the FPD unit gradation data output from said FPD unit gradation data generating means.

15. A display control apparatus in a system which includes a flat panel display (FPD) unit as a standard I/O device for performing an n-level gradation display and which can arbitrarily be connected to a color CRT display unit for performing an m-level (m>n) gradation display, the display control apparatus comprising:
- a CRT palette storing one of monochromatic CRT display unit gradation data and color CRT display unit color data;
- an arithmetic unit performing a predetermined arithmetic operation on the color CRT display unit color data stored in said CRT palette, and outputting a gradation parameter corresponding to FPD unit gradation data; and
- a selector, coupled to said arithmetic unit, receiving one of the monochromatic CRT display unit gradation data from said CRT palette and the gradation parameter from said arithmetic unit, and outputting the monochromatic CRT display unit gradation data when said monochromatic CRT display unit is connected, and outputting the FPD unit gradation data corresponding to the gradation parameter when said color CRT display unit is connected;
- a conversion table storing a correspondence between the FPD unit gradation data and one of the monochromatic CRT display unit gradation data and the gradation parameter output from said selector, and outputting the FPD unit gradation data in accordance with one of the monochromatic CRT display unit gradation data and the gradation parameter output from said selector.

16. A display control apparatus in a system which includes a flat panel display (FPD) unit as a standard I/O device for performing an n-level gradation display and which can arbitrarily be connected to a color CRT display unit for performing an m-level (m>n) gradation display, the display control apparatus comprising:
- CRT palette means for storing one of monochromatic CRT display unit gradation data and color CRT display unit color data;
- arithmetic means for performing a predetermined arithmetic operation on the color CRT display unit color data stored in said CRT palette means, and for outputting a gradation parameter corresponding to FPD unit gradation data; and
- selecting means, coupled to said arithmetic means, for receiving one of the monochromatic CRT display unit gradation data from said CRT palette means and the gradation parameter from said arithmetic means, and for outputting the monochromatic CRT display unit gradation data when said monochromatic CRT display unit is connected, and for outputting the gradation parameter output from said arithmetic means when said color CRT display unit is connected; and
- FPD unit gradation data generating means, coupled to said selecting means, for generating the FPD unit gradation data on the basis of one of the monochromatic CRT display unit gradation data and the gradation parameter output from said selecting means, and for outputting the FPD unit gradation data output from said FPD unit gradation data generating means to said FPD unit.

17. A display control system, comprising:
a flat panel display (FPD) unit performing an n-level gradation display;
a color CRT display unit or a monochromatic CRT display unit for performing an m-level (m>n) gradation display;
a CRT palette storing one of monochromatic CRT display unit gradation data and color CRT display unit color data and outputting one of the monochromatic CRT display unit gradation data and the color CRT display unit color data to one of said monochromatic CRT display unit and said color CRT display unit;
an arithmetic unit performing a predetermined arithmetic operation on the color CRT display unit color data stored in said CRT palette, and outputting a gradation parameter corresponding to FPD unit gradation data;
a selector, coupled to said arithmetic unit, receiving one of the monochromatic CRT display unit gradation data from said CRT palette and the gradation parameter from said arithmetic unit, and outputting the monochromatic CRT display unit gradation data when said monochromatic CRT display unit is connected, and outputting the gradation parameter output from said arithmetic unit when said color CRT display unit is connected; and
a conversion table storing a correspondence between the FPD unit gradation data and one of the monochromatic CRT display unit gradation data and the gradation parameter from said selector, and outputting to the FPD unit the FPD unit gradation data corresponding to one of the monochromatic CRT display unit gradation data and the gradation parameter output from said selector.

18. A display control system, comprising:
a flat panel display (FPD) unit performing an n-level gradation display;
a color CRT display unit or a monochromatic CRT display unit for performing an m-level (m>n) gradation display;
CRT palette means for storing one of monochromatic CRT display unit gradation data and color CRT display unit color data and for outputting one of the monochromatic CRT display unit gradation data and the color CRT display unit color data to one of said monochromatic CRT display unit and said color CRT display unit;
arithmetic means for performing a predetermined arithmetic operation on the color CRT display unit color data stored in said CRT palette means, and for outputting a gradation parameter corresponding to FPD unit gradation data;
selecting means, coupled to said arithmetic means, for receiving one of the monochromatic CRT display unit gradation data from said CRT palette means and the gradation parameter from said arithmetic means, and for outputting the monochromatic CRT display unit gradation data when said monochromatic CRT display unit is connected, and for outputting the gradation parameter from said arithmetic means; and
FPD unit gradation data generating means, coupled to said arithmetic means, for generating the FPD unit gradation data on the basis of one of the monochromatic CRT display unit gradation data and the gradation parameter output from said arithmetic means, and for outputting to said FPD unit the FPD unit gradation data corresponding to one of the monochromatic CRT display unit gradation data and the gradation parameter output from said selecting means.

19. A display control large scale integrated (LSI) circuit constituted by highly integrated semiconductor elements, comprising:
a CRT palette storing one of monochromatic CRT display unit gradation data and color CRT display unit color data;
an arithmetic unit, coupled to said CRT palette, receiving one of the monochromatic CRT display unit gradation data and the color CRT display unit color data, for performing a predetermined arithmetic operation on the color CRT display unit color data stored in said CRT palette, and for outputting, in response to a signal indicating one of a monochromatic CRT display unit and a CRT display unit being connected, one of the monochromatic CRT display unit gradation data stored in said CRT palette and the gradation parameter corresponding to flat panel display (FPD) unit gradation data;
first output terminal, coupled to the CRT palette, outputting one of the monochromatic CRT display unit gradation data and the color CRT display unit color data stored in said CRT palette; and
second output terminal, coupled to said arithmetic unit, outputting one of the monochromatic CRT display unit gradation data and the FPD unit gradation data corresponding to the gradation parameter output from said arithmetic unit.

20. A display control large scale integrated (LSI) circuit constituted by highly integrated semiconductor elements, comprising:
CRT palette means for storing one of monochromatic CRT display unit gradation data and color CRT display unit color data;
gradation parameter generating means, coupled to said CRT palette means, for receiving one of the monochromatic CRT display unit gradation data and the color CRT display unit color data, for performing a predetermined arithmetic operation on the color CRT display unit color data stored in said CRT palette, and for outputting, in response to a signal indicating one of a monochromatic CRT display unit and a color CRT display unit being connected, one of the monochromatic CRT display unit gradation data stored in said CRT palette and the gradation parameter corresponding to flat panel display (FPD) unit gradation data;
first output means, coupled to said CRT palette means, for outputting one of the monochromatic CRT display unit gradation data and the color CRT display unit color data stored in said CRT palette means; and
second output means, coupled to said gradation parameter generating means, for outputting one of the monochromatic CRT display unit gradation data and the FPD unit gradation data corresponding to the gradation parameter output from said gradation parameter generating means.

21. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

- a CRT palette storing one of monochromatic CRT display unit gradation data and color CRT display unit color data and outputting one of the monochromatic CRT display unit gradation data and the color CRT display unit color data to one of said monochromatic CRT display unit and the color CRT display unit; and
- an arithmetic unit, coupled to said CRT palette, receiving one of the monochromatic CRT display unit gradation data and the color CRT display unit color data, for performing a predetermined arithmetic operation on the color CRT display unit color data stored in said CRT palette, and for outputting, in response to a signal indicating one of said monochromatic CRT display unit and said color CRT display unit being connected, one of the monochromatic CRT display unit gradation data stored in said CRT palette and FPD unit gradation data corresponding to the color CRT display unit color data.

22. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

- CRT palette means for storing one of monochromatic CRT display unit gradation data and color CRT display unit color data and outputting one of the monochromatic CRT display unit gradation data and the color CRT display unit color data to one of said monochromatic CRT display unit and the color CRT display unit; and
- gradation parameter generating means, coupled to said CRT palette means, for receiving one of the monochromatic CRT display unit gradation data and the color CRT display unit color data, for performing a predetermined arithmetic operation on the color CRT display unit color data stored in said CRT palette, and for outputting, in response to a signal indicating one of said monochromatic CRT display unit and said color CRT display unit being connected, one of the monochromatic CRT display unit gradation data and FPD unit gradation data corresponding to the color CRT display unit color data.

23. A display control system, comprising:

- a flat panel display (FPD) unit performing an n-level gradation display;
- a color CRT display unit or a monochromatic CRT display unit for performing an m-level (m>n) gradation display;
- a CRT palette storing one of monochromatic CRT display unit gradation data and color CRT display unit color data and outputting one of the monochromatic CRT display unit gradation data and the color CRT display unit color data to one of said monochromatic CRT display unit and the color CRT display unit; and
- an arithmetic unit, coupled to said CRT palette, receiving one of the monochromatic CRT display unit gradation data and the color CRT display unit color data, for performing a predetermined arithmetic operation on the color CRT display unit color data stored in said CRT palette, and for outputting, in response to a signal indicating that one of said monochromatic CRT display unit and said color CRT display unit is connected, one of the monochromatic CRT display unit gradation data and FPD unit gradation data corresponding to the color CRT display unit color data.

24. A display control system, comprising:

- a flat panel display unit performing an n-level gradation display;
- a color CRT display unit or a monochromatic CRT display unit for performing an m-level (m>n) gradation display;
- CRT palette means for storing one of monochromatic CRT display unit gradation data and color CRT display unit color data and outputting one of the monochromatic CRT display unit gradation data and the color CRT display unit color data to one of said monochromatic CRT display unit and said color CRT display unit; and
- gradation parameter generating means, coupled to said CRT palette means, for receiving one of the monochromatic CRT display unit gradation data and the color CRT display unit color data, for performing a predetermined arithmetic operation on the color CRT display unit color data stored in said CRT palette, and for outputting, in response to a signal indicating that one of said monochromatic CRT display unit and said color CRT display unit is connected, one of the monochromatic CRT display unit gradation data and FPD unit gradation data corresponding to the color CRT display unit color data.

25. A display control large scale integrated (LSI) circuit constituted by highly integrated semiconductor elements, comprising:

- a CRT palette storing one of monochromatic CRT display unit gradation data and color CRT display unit color data;
- an arithmetic unit, coupled to said CRT palette, receiving one of the monochromatic CRT display unit gradation data and the color CRT display unit color data from said CRT palette, performing a predetermined arithmetic operation on the color CRT display unit color data stored in said CRT palette, and outputting, in response to a signal indicating that one of a monochromatic CRT display unit and a color CRT display unit is connected, one of the monochromatic CRT display unit gradation data stored in said CRT palette and the gradation parameter corresponding to flat panel display (FPD) unit gradation data;
- a conversion table storing a correspondence between the FPD unit gradation data and one of the monochromatic CRT display unit gradation data and the gradation parameter output from said arithmetic unit, and outputting the FPD unit gradation data in accordance with one of the monochromatic CRT display unit gradation data and the gradation parameter output from said arithmetic unit;
- first output terminal, coupled to said CRT palette, outputting one of the monochromatic CRT display unit gradation data and the color CRT display unit color data stored in said CRT palette; and
- second output terminal, coupled to said conversion table, outputting the FPD unit gradation data output from said conversion table.

26. A display control large scale integrated (LSI) circuit constituted by highly integrated semiconductor elements, comprising:

CRT palette means for storing one of monochromatic CRT display unit gradation data and color CRT display unit color data;

gradation parameter generating means, coupled to said CRT palette means, for receiving one of the monochromatic CRT display unit gradation data and the color CRT display unit color data, for performing a predetermined arithmetic operation on the color CRT display unit color data stored in said CRT palette, and for outputting, in response to a signal indicating that one of a monochromatic CRT display unit and a color CRT display unit is connected, one of the monochromatic CRT display unit gradation data stored in said CRT palette and the gradation parameter corresponding to flat panel display (FPD) unit gradation data;

FPD unit gradation data generating means for generating the FPD unit gradation data on the basis of the data output from the gradation parameter generating means, and for outputting the generated FPD unit gradation data;

first output means, coupled to the CRT palette means, for outputting one of the monochromatic CRT display unit gradation data and the color CRT display unit color data stored in said CRT palette means; and second output means, coupled to said FPD unit gradation data generating means, for outputting the FPD unit gradation data output from said FPD unit gradation data generating means.

27. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

a CRT palette storing one of monochromatic CRT display unit gradation data and color CRT display unit color data and outputting one of the monochromatic CRT display unit gradation data and the color CRT display unit color data to one of said monochromatic CRT display unit and said color CRT display unit;

an arithmetic unit, coupled to said CRT palette, receiving one of the monochromatic CRT display unit gradation data and the color CRT display unit color data, for performing a predetermined arithmetic operation on the color CRT display unit color data stored in said CRT palette, and for outputting, in response to a signal indicating that one of said monochromatic CRT display unit and said color CRT display unit is connected, one of the monochromatic CRT display unit gradation data stored in said CRT palette and the gradation parameter corresponding to FPD unit gradation data; and a conversion table storing a correspondence between the FPD unit gradation data and one of the monochromatic CRT display unit gradation data stored in said CRT palette and the gradation parameter from said arithmetic unit, and outputting the FPD unit gradation data in accordance with one of the monochromatic CRT display unit gradation data and the gradation parameter output from said arithmetic unit.

28. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

CRT palette means for storing one of monochromatic CRT display unit gradation data and color CRT display unit color data and outputting one of the monochromatic CRT display unit gradation data and the color CRT display unit color data to one of said monochromatic CRT display unit and said color CRT display unit;

gradation parameter generating means, coupled to said CRT palette means, for receiving one of the monochromatic CRT display unit gradation data and the color CRT display unit color data, for performing a predetermined arithmetic operation on the color CRT display unit color data stored in said CRT palette, and for outputting, in response to a signal indicating that one of said monochromatic CRT display unit and said color CRT display unit is connected, one of the monochromatic CRT display unit gradation data and the gradation parameter corresponding to FPD unit gradation data; and FPD unit gradation data generating means, coupled to said gradation parameter generating means, for generating the FPD unit gradation data on the basis of one of the monochromatic CRT display unit gradation data and the gradation parameter output from said gradation parameter generating, and for outputting the generated FPD unit gradation data to said FPD unit.

29. A display control system, comprising:

a flat panel display (FPD) unit performing an n-level gradation display;

a color CRT display unit or a monochromatic CRT display unit performing an m-level (m>n) gradation display;

a CRT palette storing one of monochromatic CRT display unit gradation data and color CRT display unit color data and outputting one of the monochromatic CRT display unit gradation data and the color CRT display unit color data to one of said monochromatic CRT display unit and said color CRT display unit;

an arithmetic unit, coupled to said CRT palette, receiving one of the monochromatic CRT display unit gradation data and the color CRT display unit color data, performing a predetermined arithmetic operation on the color CRT display unit color data stored in said CRT palette, and outputting, in response to a signal indicating that one of said monochromatic CRT display unit and said color CRT display unit is connected, one of the monochromatic CRT display unit gradation data and the gradation parameter corresponding to FPD unit gradation data; and a conversion table storing a correspondence between the FPD unit gradation data and one of the monochromatic CRT display unit gradation data stored in said CRT palette and the gradation parameter from said arithmetic unit, and outputting the FPD unit gradation data in accordance with one of the monochromatic CRT display unit gradation data and the gradation parameter output from said arithmetic unit.

30. A display control system, comprising:
- a flat panel display (FPD) unit performing an n-level gradation display;
- a color CRT display unit or a monochromatic CRT display unit performing an m-level (m>n) gradation display;
- CRT palette means for storing one of monochromatic CRT display unit gradation data and color CRT display unit color data and for outputting one of the monochromatic CRT display unit gradation data and the color CRT display unit color data to one of said monochromatic CRT display unit and said color CRT display unit;
- gradation parameter generating means, coupled to said CRT palette means, for receiving one of the monochromatic CRT display unit gradation data and the color CRT display unit color data, for performing a predetermined arithmetic operation on the color CRT display unit color data stored in said CRT palette means, and for outputting, in response to a signal indicating that one of said monochromatic CRT display unit and said color CRT display unit is connected, the monochromatic CRT display unit gradation data and FPD unit gradation data corresponding to the gradation parameter; and
- FPD unit gradation data generating means, coupled to said gradation parameter generating means, for generating the FPD unit gradation data on the basis of one of the monochromatic CRT display unit gradation data and the gradation parameter output from said gradation parameter generating means, and for outputting the generated FPD unit gradation data to said FPD unit.

31. A display control large scale integrated (LSI) circuit constituted by highly integrated semiconductor elements, comprising:
- a CRT palette storing one of monochromatic CRT display unit gradation data and color CRT display unit color data;
- a flat panel display (FPD) unit palette storing FPD unit gradation data;
- arithmetic unit performing a predetermined arithmetic operation on the color CRT display unit color data stored in said CRT palette, and for outputting a gradation parameter corresponding to the FPD unit gradation data;
- selector, coupled to said arithmetic unit, for receiving one of the monochromatic CRT display unit gradation data from said CRT palette and the gradation parameter from said arithmetic unit, and for outputting the monochromatic CRT display unit gradation data when said monochromatic CRT display unit is connected, and for outputting the gradation parameter when said color CRT display unit is connected;
- first output terminal, coupled to said CRT palette, outputting one of the monochromatic CRT display unit gradation data and the color CRT display unit color data stored in said CRT palette; and
- second output terminal, coupled to said FPD unit palette, outputting one of the monochromatic CRT display unit gradation data and the FPD unit gradation data corresponding to the gradation parameter from said arithmetic unit in response to a change in one of the monochromatic CRT display unit gradation data and the color CRT display unit color data stored in said CRT palette means.

32. A display control large scale integrated (LSI) circuit constituted by highly integrated semiconductor elements, comprising:
- CRT palette means for storing one of monochromatic CRT display unit gradation data and color CRT display unit color data;
- FPD palette means for storing flat panel display (FPD) unit gradation data;
- arithmetic means for performing a predetermined arithmetic operation on the color CRT display unit color data stored in said CRT palette means, and for outputting a gradation parameter corresponding to the FPD unit gradation data;
- selecting means, coupled to said arithmetic means, for receiving one of the monochromatic CRT display unit gradation data from said CRT palette and the gradation parameter from said arithmetic means, and for outputting the monochromatic CRT display unit gradation data when said monochromatic CRT display unit is connected, and for outputting the gradation parameter when said color CRT display unit is connected;
- first output means, coupled to said CRT palette means, for outputting one of the monochromatic CRT display unit gradation data and the color CRT display unit color data stored in said CRT palette; and
- second output means, coupled to said selecting means, outputting one of the monochromatic CRT display unit gradation data and the FPD unit gradation data corresponding to the gradation parameter from said arithmetic means, in response to a change in one of the monochromatic CRT display unit gradation data and the color CRT display unit color data stored in said CRT palette means.

33. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:
- a CRT palette storing one of monochromatic CRT display unit gradation data and color CRT display unit color data and outputting one of the monochromatic CRT display unit gradation data and the color CRT display unit color data to one of said monochromatic CRT display unit and the color CRT display unit;
- an FPD palette storing FPD unit gradation data;
- an arithmetic unit performing a predetermined arithmetic operation on the color CRT display unit color data stored in said CRT palette, and outputting a gradation parameter corresponding to the FPD unit gradation data; and
- a selector, coupled to said arithmetic unit, receiving one of the monochromatic CRT display unit gradation data from said CRT palette and the gradation parameter from said arithmetic unit, and outputting the monochromatic CRT display unit gradation data when said monochromatic CRT display unit is connected, and outputting to said FPD palette the FPD unit gradation data corresponding to the gradation parameter when said color CRT display unit is connected, in response to a change in one of the monochromatic CRT display unit gradation data and the color CRT display unit color data stored in said CRT palette.

34. A display control apparatus in a system which includes a flat panel display (FPD) unit as a standard I/O device for performing an n-level gradation display and which can arbitrarily be connected to one of a monochromatic CRT display unit and a color CRT display unit for performing an m-level (m>n) gradation display, the display control apparatus comprising:

CRT palette means for storing one of monochromatic CRT display unit gradation data and color CRT display unit color data and outputting one of the monochromatic CRT display unit gradation data and the color CRT display unit color data to one of said monochromatic CRT display unit and the color CRT display unit;

FPD palette means for storing FPD unit gradation data;

arithmetic means for performing a predetermined arithmetic operation on the color CRT display unit color data stored in said CRT palette means, and for outputting a gradation parameter corresponding to the FPD unit gradation data; and selecting means, coupled to said arithmetic means, for receiving one of the monochromatic CRT display unit gradation data from said CRT palette means and the gradation parameter from said arithmetic means, and for outputting to said FPD palette means the monochromatic CRT display unit gradation data when said monochromatic CRT display unit is connected, and outputting the FPD unit gradation data corresponding to the gradation parameter when said color CRT display unit is connected, in response to a change in one of the monochromatic CRT display unit gradation data and the color CRT display unit color data stored in said CRT palette means.

35. A display control system, comprising:

a flat panel display (FPD) unit performing an n-level gradation display;

a color CRT display unit or a monochromatic CRT display unit for performing an m-level (m>n) gradation display;

a CRT palette storing one of monochromatic CRT display unit gradation data and color CRT display unit color data and outputting one of the monochromatic CRT display unit gradation data and the color CRT display unit color data to one of said monochromatic CRT display unit and said color CRT display unit;

an FPD palette storing FPD unit gradation data;

an arithmetic unit performing a predetermined arithmetic operation on the color CRT display unit color data stored in said CRT palette, and outputting a gradation parameter corresponding to the FPD unit gradation data;

a selector, coupled to said arithmetic unit, receiving one of the monochromatic CRT display unit gradation data from said CRT palette and the gradation parameter from said arithmetic unit, and outputting to said FPD palette the monochromatic CRT display unit gradation data when said monochromatic CRT display unit is connected, and outputting the FPD unit gradation data corresponding to the gradation parameter from said arithmetic unit when said color CRT display unit is connected, in response to a change in one of the monochromatic CRT display unit gradation data and the color CRT display unit color data stored in said CRT palette.

36. A display control system, comprising:

a flat panel display (FPD) unit performing an n-level gradation display;

a color CRT display unit or a monochromatic CRT display unit for performing an m-level (m>n) gradation display;

CRT palette means for storing one of monochromatic CRT display unit gradation data and color CRT display unit color data and outputting one of the monochromatic CRT display unit gradation data and the color CRT display unit color data to one of said monochromatic CRT display unit and the color CRT display unit;

FPD palette means for storing FPD unit gradation data;

arithmetic means for performing a predetermined arithmetic operation on the color CRT display unit color data stored in said CRT palette, and for outputting a gradation parameter corresponding to the FPD unit gradation data;

selecting means, coupled to said arithmetic unit, for receiving one of the monochromatic CRT display unit gradation data from said CRT palette means and the gradation parameter from said arithmetic means, and for outputting to said FPD palette means the monochromatic CRT display unit gradation data when said monochromatic CRT display unit is connected, and outputting the FPD unit gradation data corresponding to the gradation parameter from said arithmetic unit when said color CRT display unit is connected, in response to a change in one of the monochromatic CRT display unit gradation data and the color CRT display unit color data stored in said CRT palette means.

37. A display control large scale integrated (LSI) circuit constituted by highly integrated semiconductor elements, comprising:

a CRT palette storing color CRT display unit color data;

a flat panel display (FPD) unit palette storing FPD unit gradation data;

an arithmetic unit performing a predetermined arithmetic operation on the color CRT display unit color data stored in said CRT palette and outputting a gradation parameter corresponding to the FPD unit gradation data; and a conversion table storing a correspondence between the FPD unit gradation data and the gradation parameter from said arithmetic unit, and outputting to said FPD unit palette the FPD unit gradation data in accordance with the gradation parameter output from said arithmetic unit;

a first output terminal, coupled to said CRT palette, outputting the color CRT display unit color data stored in said CRT palette; and a second output terminal, coupled to said FPD unit palette, outputting the FPD unit gradation data output from said conversion table, in response to a change in the color CRT display unit color data stored in said CRT palette.

38. A display control large scale integrated (LSI) circuit constituted by highly integrated semiconductor elements, comprising:

CRT palette means for storing color CRT display unit color data;

flat panel display (FPD) unit palette means for storing FPD unit gradation data;

arithmetic means for performing a predetermined arithmetic operation on the color CRT display unit color data stored in said CRT palette and outputting a gradation parameter corresponding to the FPD unit gradation data; and conversion table means for storing a correspondence between the FPD unit gradation data and the gradation parameter from said arithmetic means, and for outputting to said FPD unit palette means the FPD unit gradation data in accordance with the gradation parameter output from said arithmetic means;

first output means, coupled to said CRT palette means, for outputting the color CRT display unit color data stored in said CRT palette means; and second output means, coupled to said FPD unit palette means, for outputting the FPD unit gradation data output from said FPD unit palette means, in response to a change in the color CRT display unit color data stored in said CRT palette means.

39. A display control apparatus in a system which includes a flat panel display (FPD) unit as a standard I/O device for performing an n-level gradation display and which can arbitrarily be connected to a color CRT display unit for performing an m-level (m>n) gradation display, the display control apparatus comprising:

a CRT palette storing color CRT display unit color data;

a FPD unit palette storing FPD unit gradation data;

an arithmetic unit performing a predetermined arithmetic operation on the color CRT display unit color data stored in said CRT palette, and outputting a gradation parameter corresponding to the FPD unit gradation data; and a conversion table storing a correspondence between the FPD unit gradation data and the gradation parameter from said arithmetic unit, and outputting to said FPD unit palette the FPD unit gradation data in accordance with the gradation parameter output from said arithmetic unit, in response to a change in the color CRT display unit color data stored in said CRT palette.

40. A display control apparatus in a system which includes a flat panel display (FPD) unit as a standard I/O device for performing an n-level gradation display and which can arbitrarily be connected to a color CRT display unit for performing an m-level (m>n) gradation display, the display control apparatus comprising:

CRT palette means for storing color CRT display unit color data;

FPD unit palette means for storing FPD unit gradation data;

arithmetic unit means for performing a predetermined arithmetic operation on the color CRT display unit color data stored in said CRT palette means, and for outputting a gradation parameter corresponding to the FPD unit gradation data; and FPD unit gradation data generating means, coupled to said arithmetic means, for generating the FPD unit gradation data on the basis of the gradation parameter output from said arithmetic means, and for outputting to said FPD unit palette means the FPD unit gradation data, in response to a change in the color CRT display unit color data stored in said CRT palette means.

41. A display control system, comprising:

a flat panel display (FPD) unit performing an n-level gradation display;

a color CRT display unit or a monochromatic CRT display unit for performing an m-level (m>n) gradation display;

a CRT palette storing color CRT display unit color data and outputting the color CRT display unit color data to said color CRT display unit;

a FPD unit palette storing FPD unit gradation data;

an arithmetic unit performing a predetermined arithmetic operation on the color CRT display unit color data stored in said CRT palette, and outputting a gradation parameter corresponding to the FPD unit gradation data; and a conversion table storing a correspondence between the FPD unit gradation data and the gradation parameter from said arithmetic unit, and outputting to said FPD unit palette the FPD unit gradation data output from said conversion table, in response to a change in the color CRT display unit color data stored in said CRT palette.

42. A display control system, comprising:

a flat panel display (FPD) unit performing an n-level gradation display;

a color CRT display unit or a monochromatic CRT display unit for performing an m-level (m>n) gradation display;

CRT palette means for storing color CRT display unit color data and for outputting the color CRT display unit color data to said color CRT display unit;

FPD unit palette means for storing FPD unit gradation data;

arithmetic means for performing a predetermined arithmetic operation on the color CRT display unit color data stored in said CRT palette, and for outputting a gradation parameter corresponding to the flat panel display (FPD) unit gradation data; and FPD unit gradation data generating means, coupled to said arithmetic means, for generating the FPD unit gradation data on the basis of the gradation parameter output from said arithmetic means, and for outputting to said FPD unit palette means the FPD unit gradation data, in response to a change in the color CRT display unit color data stored in said CRT palette.

* * * * *